(12) United States Patent
Phipps et al.

(10) Patent No.: US 11,852,208 B2
(45) Date of Patent: Dec. 26, 2023

(54) BRAKE PAD WITH SURFACE COATING HAVING PREDETERMINED DESIGN

(71) Applicant: Robert Bosch GmbH, Stuttgart (DE)

(72) Inventors: Mark Phipps, Wayne, IL (US); Michael Getty, Naperville, IL (US); Robert Backode, Naperville, IL (US)

(73) Assignees: Robert Bosch LLC, Broadview, IL (US); Robert Bosch GmbH, Stuttgart (DE)

( * ) Notice: Subject to any disclaimer, the term of this patent is extended or adjusted under 35 U.S.C. 154(b) by 0 days.

(21) Appl. No.: 17/405,366

(22) Filed: Aug. 18, 2021

(65) Prior Publication Data

US 2021/0381564 A1 Dec. 9, 2021

Related U.S. Application Data

(63) Continuation of application No. 16/550,528, filed on Aug. 26, 2019, now Pat. No. 11,125,290.

(51) Int. Cl.
*F16D 65/12* (2006.01)
*F16D 65/092* (2006.01)
*F16D 69/04* (2006.01)
*F16D 69/00* (2006.01)

(52) U.S. Cl.
CPC ........ *F16D 65/127* (2013.01); *F16D 65/092* (2013.01); *F16D 2069/001* (2013.01); *F16D 2069/0441* (2013.01)

(58) Field of Classification Search
CPC ...... F16D 65/127; F16D 65/092; F16D 65/82; F16D 65/0037; F16D 69/02; F16D 2069/0441; F16D 2069/001; F16D 69/026
See application file for complete search history.

(56) References Cited

U.S. PATENT DOCUMENTS

| | | | | |
|---|---|---|---|---|
| 5,407,035 | A * | 4/1995 | Cole | F16D 65/127 188/218 XL |
| 6,109,399 | A * | 8/2000 | Crawford | F16D 69/04 188/24.11 |
| 6,585,089 | B1 * | 7/2003 | Parker | F16D 65/092 188/218 XL |
| 7,320,386 | B2 * | 1/2008 | Kulis, Jr. | F16D 69/04 188/250 G |
| D612,780 | S * | 3/2010 | Liu | D12/180 |
| D624,859 | S * | 10/2010 | Kahan | D12/180 |
| 8,960,378 | B2 * | 2/2015 | Moore | F16D 69/02 188/242 |
| 10,690,201 | B2 * | 6/2020 | Mohseni | F16D 69/02 |
| 11,125,290 | B2 * | 9/2021 | Phipps | F16D 65/127 |
| 11,428,281 | B2 * | 8/2022 | Mohseni | B32B 9/005 |

* cited by examiner

*Primary Examiner* — Pamela Rodriguez
(74) *Attorney, Agent, or Firm* — David Kovacek; Maginot, Moore & Beck LLP

(57) ABSTRACT

A brake pad having a backing plate, friction lining, and a surface coating adhered to the friction lining. The surface coating may be formulated to generate a transfer layer on a brake rotor faster than the friction lining alone. The surface coating may be adhered to the friction lining in a predetermined design.

16 Claims, 11 Drawing Sheets

BRAKE PAD WITH SURFACE COATING HAVING PREDETERMINED DESIGN

This application is a continuation of U.S. application Ser. No. 16/550,528, now U.S. Pat. No. 11,125,290, filed Aug. 26, 2019.

TECHNICAL FIELD

This disclosure relates to brake pads and the assembly of brake pads.

BACKGROUND

Brake pads used in motor vehicles undergo a "bedding-in" process that involves a gradual deposition of friction material onto the surface of the brake rotor. After the bedding-in process, brake pads behave more efficiently and more smoothly transfer braking power.

However, the bedding-in process is time-consuming and may require slow and deliberate operation for newly installed brakes to be most effective. Current brake systems may suffer rapid heat build-up if the brakes are applied before or during the bedding-in process, which may cause damage to the brake rotor from warping. The brake pads themselves may suffer from a "glazing" of the surface material if exposed to excessive heat build-up, reducing the efficiency of the brakes and diminishing the operational lifespan of the brake pad.

SUMMARY

One aspect of this disclosure is directed to a brake pad comprising a back plate having a mounting surface, a friction lining coupled to the mounting surface, and a surface coating affixed to a tribological surface of the friction lining. The tribological surface of the friction lining may be operable to apply friction to a drum rotor, creating braking power. The surface coating may be affixed to the tribological surface using an adhesive. In some embodiments, the surface coating may be applied using a stamping operation. In some embodiments, the surface coating may comprise a predetermined design, such as a geometric pattern or an asymmetrical distribution with respect to the tribological surface.

Another aspect of this disclosure is directed to a brake pad comprising a back plate, friction lining, and surface coating, wherein the surface coating is visually distinctive from the friction lining. In some embodiments, the visual distinctiveness of the friction lining and the surface coating may permit the surface coating to be applied using a predetermined design creating a distinct visual effect.

The above aspects of this disclosure and other aspects will be explained in greater detail below with reference to the attached drawings.

DETAILED DESCRIPTION

The illustrated embodiments are disclosed with reference to the drawings. However, it is to be understood that the disclosed embodiments are intended to be merely examples that may be embodied in various and alternative forms. The figures are not necessarily to scale and some features may be exaggerated or minimized to show details of particular components. The specific structural and functional details disclosed are not to be interpreted as limiting, but as a representative basis for teaching one skilled in the art how to practice the disclosed concepts.

Figure 1:
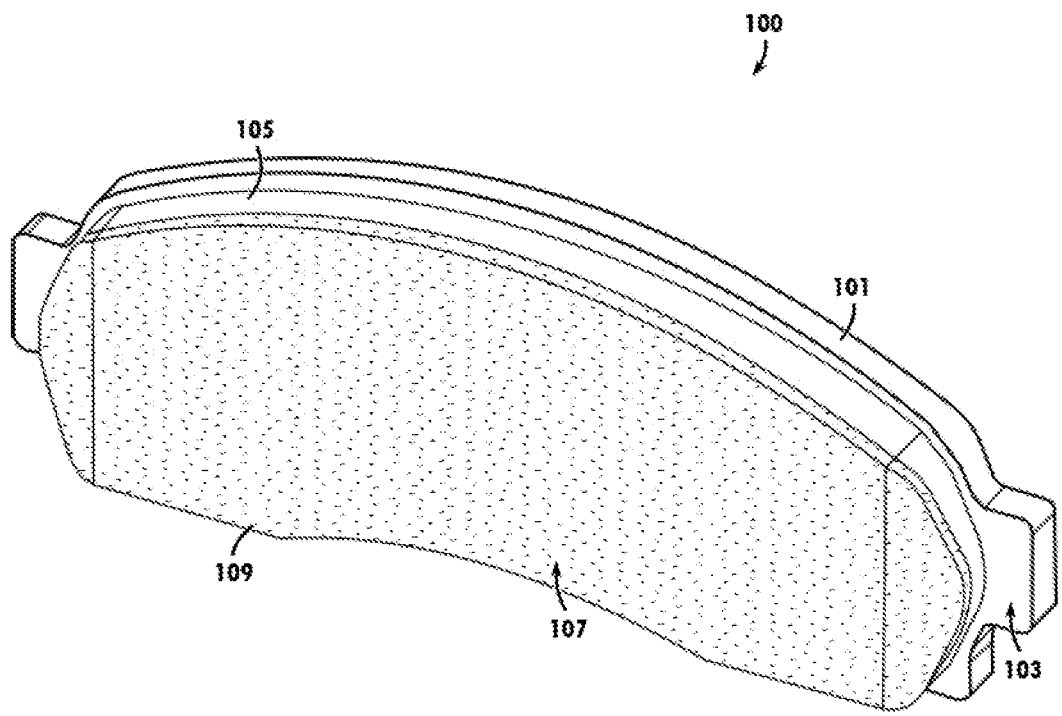
FIG. 1 is an illustration of a brake pad having a surface coating.

FIG. 1 shows a brake pad 100 according to an embodiment of the teachings herein. Brake pad 100 comprises a backing plate 101 having a mounting surface 103. Mounting surface 103 may be suitable to provide a coupling surface between backing plate 101 and a friction lining 105. Friction lining 105 may be operable to apply friction forces to a braking rotor, thus creating braking power for a vehicle. Friction forces of friction lining 105 are transferred via a tribological surface 107, which is substantially parallel to the mounting surface 103 within a specified tolerance. The formulation of friction lining 105 may be suited to a particular vehicle type, brake design, brake rotor type, or any combination thereof without deviating from the teachings disclosed herein.

During normal braking operations, friction lining 105 wears away, and may leave residual material on the surface of a drum rotor during a bedding-in period of operation. This residual material is known as a "transfer layer" and a properly developed transfer layer can improve the efficiency of braking, the smoothness of the braking force application, and the operable lifespan of the brake pad. Until the bedding-in is completed, the brakes may operate at sub-optimal performance.

The transfer layer also reduces heat buildup during braking, which may prevent damage to the brake rotor or detrimental effects of heat on the friction lining. However, because friction lining 105 is formulated to resist wear, the bedding-in may take longer than is desired. For this reason, brake pad 100 comprises a surface coating 109 applied to the tribological surface 107 of friction lining 105.

Surface coating 109 may advantageously be formulated to readily create a transfer layer having characteristics similar to that of friction lining 105, except forming more rapidly under normal use. The transfer layer generated by surface coating 109 may exhibit friction characteristics similar to a transfer layer generated by friction lining 105 within specified tolerances, except the transfer layer may be generated at substantially lower levels of heat and substantially less braking cycles than friction lining 105 alone. As a result, the brake rotor may be protected from heat-related warping, and friction lining 105 may be protected from adverse conditions cause by heat buildup during the bedding-in. In some previous designs, bedding-in may require 300-400 miles of operation, but adding surface coating 109 may advantageously reduce the necessary operation to complete the bedding-in. The formulation of surface coating 109 may be suited to a particular vehicle type, brake design, brake rotor type, friction lining formulation, or any combination thereof without deviating from the teachings disclosed herein.

Surface coating 109 may be applied to friction lining 105 using an adhesive. The adhesive may be formulated for a curing time that is suitably long for a complete application, but sufficiently short that addition of a surface coating to brake pad 100 has a minimized impact on manufacturing and production times. In some embodiments, curing times may be 180 seconds or less. In some embodiments, curing times may be 60 seconds. In the depicted embodiment, the curing time may be accelerated using forced drying using heat, but other embodiments may utilize ambient temperature drying without deviating from the teachings disclosed herein. In some embodiments, commercially-available adhesives may be utilized, such as a "quick-drying" formulation. In some embodiments, the adhesive may comprise aliphatic resin or polyvinyl acetate. Other embodiments may comprise other formulations without deviating from the teachings disclosed herein.

FIG. 1 provides an illustration of a brake pad 100 having an even application of surface coating 109 to the entire area of tribological surface 107 of friction lining 105. Other embodiments may comprise different applications, which may advantageously be utilized to accommodate for different vehicle specifications. Application of surface coating 109 may be applied using a stamping operation, which is operable to accommodate a wide variety of application designs. A stamping operation may advantageously permit utilization of any arbitrary design desired during manufacturing.

In the depicted embodiment, surface coating 109 provides a distinct visual appearance to friction lining 105, making the design of the application visually identifiable. Such visual distinction may advantageously permit surface coating 109 be applied to friction lining 105 in a way that allows for branding in addition to operational advantages. Application of the surface coating 109 may utilize an arbitrary design without deviating from the teachings disclosed herein. For example, a design may be sold with a particular aesthetic or trademarked design to identify a brake pad as having been made by a particular manufacturer.

Figure 2:
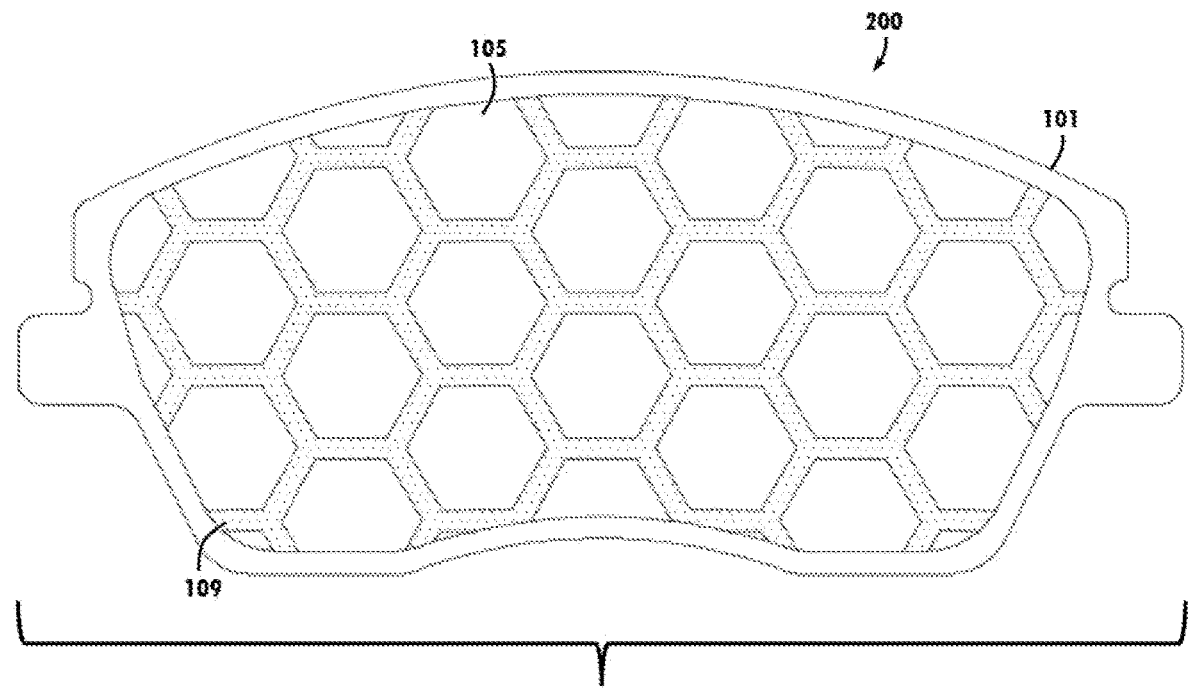
FIG. 2 is an illustration of a brake pad having a surface coating applied in a predetermined design.
Figure 3:
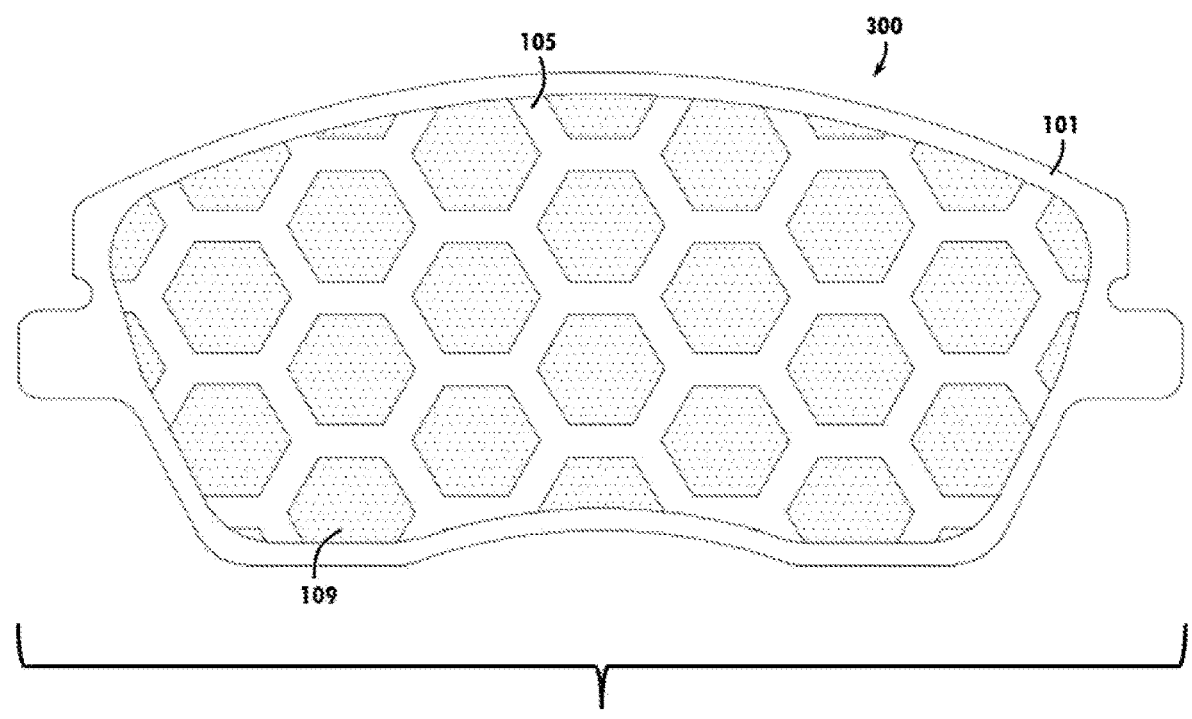
FIG. 3 is an illustration of a brake pad having a surface coating applied in a predetermined design.

In some embodiments, the application of surface coating 109 may provide for a geometric pattern. FIG. 2 is an illustration of a brake pad 200 that utilizes the same backing plate 101, friction lining 105, and formulation of surface coating 109 as brake pad 100, but the application of surface coating 109 forms a geometric pattern comprising a grid of hexagons. FIG. 3 is an illustration of a brake pad 300 that utilizes the same backing plate 101, friction lining 105, and formulation of surface coating 109 as brake pad 100, but the application of surface coating 109 forms a geometric pattern comprising a repeated pattern of hexagons. Other embodiments may have other designs or other embodiments without deviating from the teachings disclosed herein.

Figure 4:
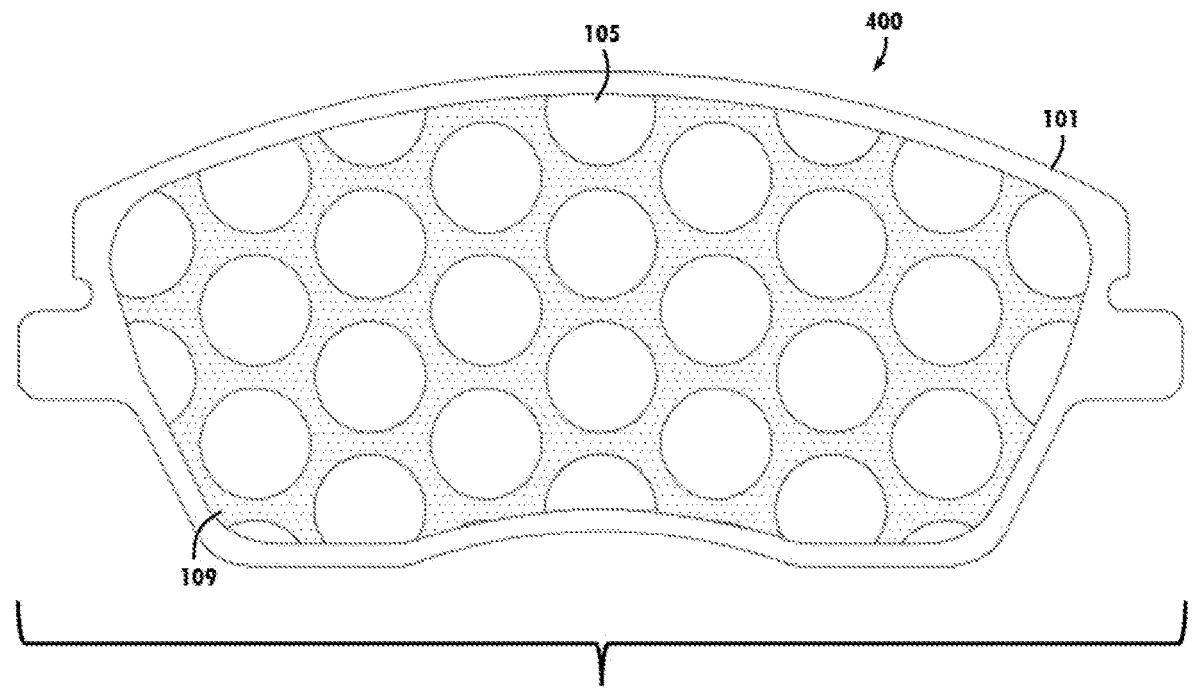
FIG. 4 is an illustration of a brake pad having a surface coating applied in a predetermined design.
Figure 5:
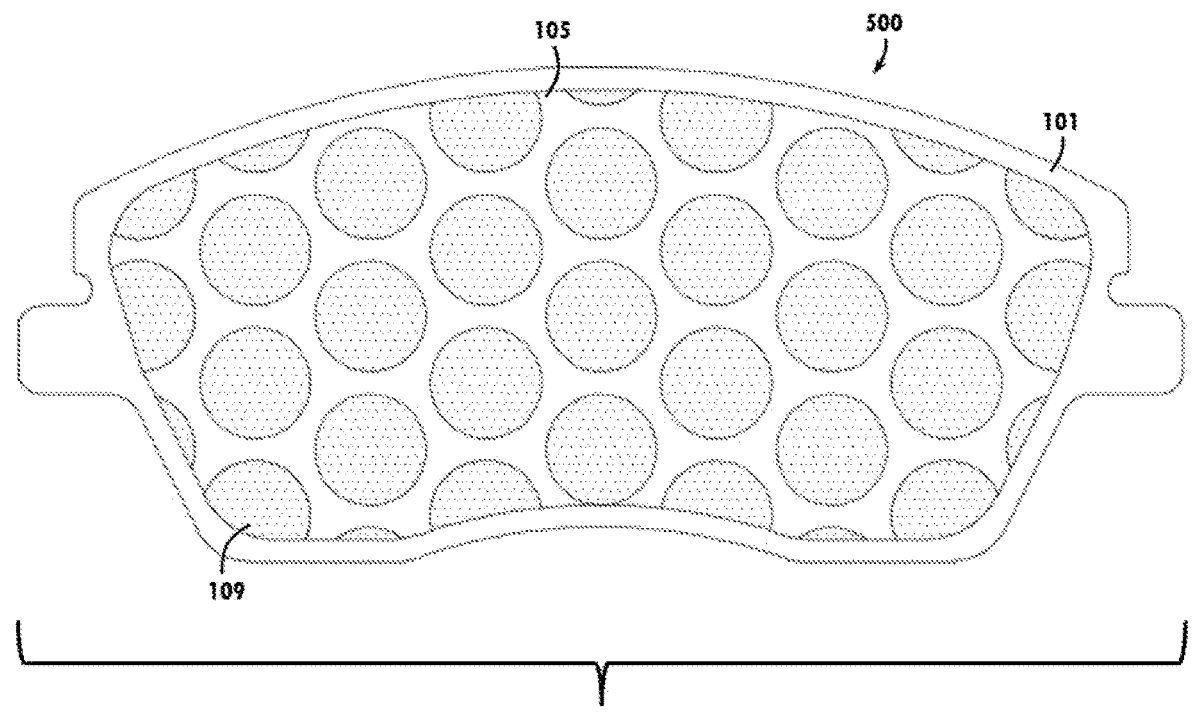
FIG. 5 is an illustration of a brake pad having a surface coating applied in a predetermined design.

FIG. 4 is an illustration of a brake pad 300 that utilizes the same backing plate 101, friction lining 105, and formulation of surface coating 109 as brake pad 100, but the application of surface coating 109 forms a geometric pattern comprising a grid of circular outlines. FIG. 5 is an illustration of a brake pad 500 that utilizes the same backing plate 101, friction lining 105, and formulation of surface coating 109 as brake pad 100, but the application of surface coating 109 forms a geometric pattern comprising a repeated pattern of circles. Though in the depicted embodiments of FIG. 4 and FIG. 5 the geometric patterns are directed to circles, other embodiments may be directed to other elliptical shapes, such as ellipses, ovals, or conic sections without deviating from the teachings disclosed herein.

Figure 6:
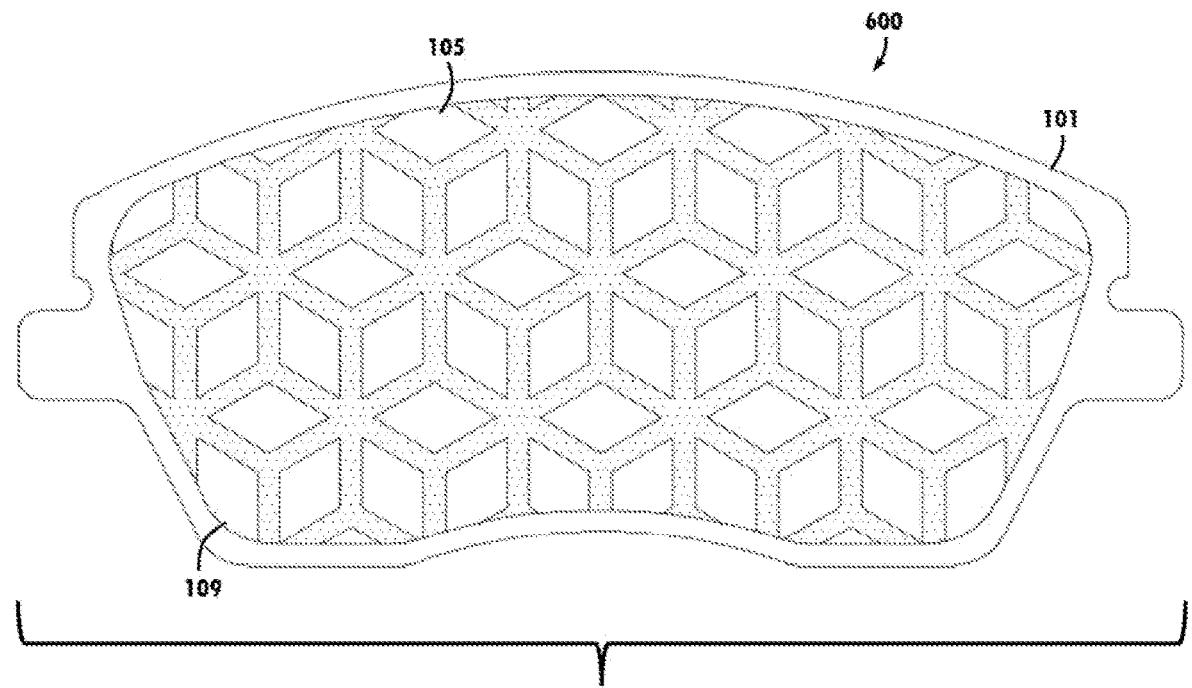
FIG. 6 is an illustration of a brake pad having a surface coating applied in a predetermined design.
Figure 7:
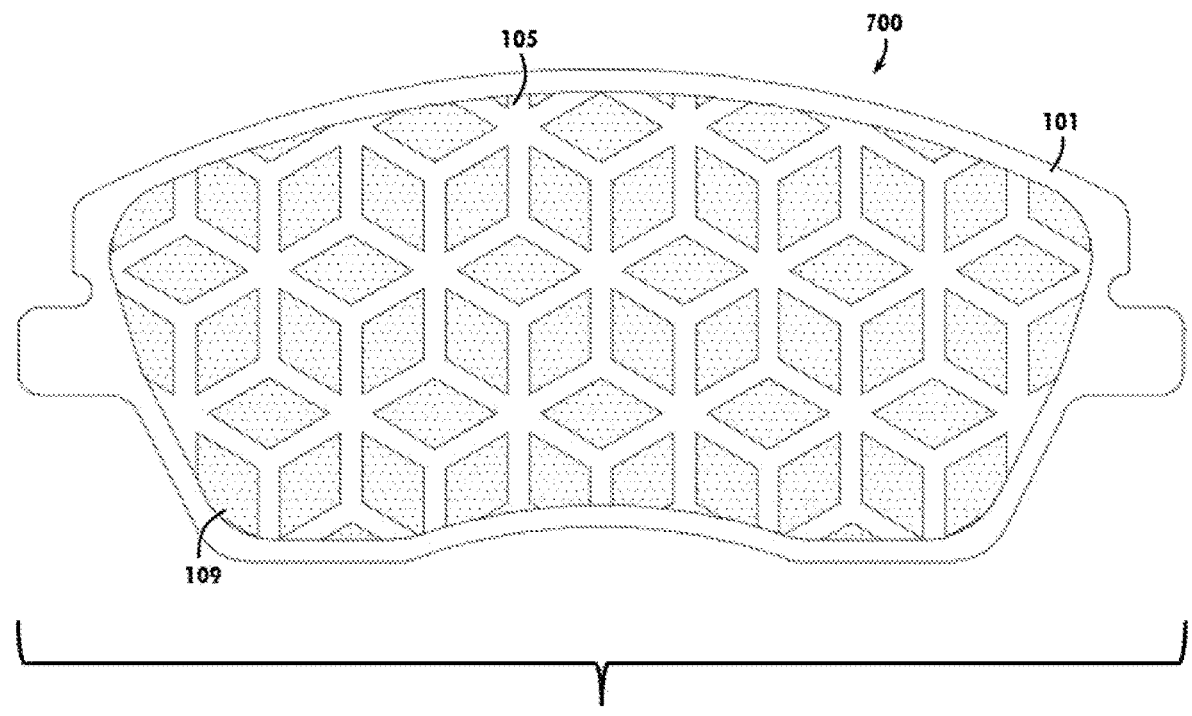
FIG. 7 is an illustration of a brake pad having a surface coating applied in a predetermined design.

FIG. 6 is an illustration of a brake pad 200 that utilizes the same backing plate 101, friction lining 105, and formulation of surface coating 109 as brake pad 100, but the application of surface coating 109 forms a geometric pattern comprising a grid of parallelograms. FIG. 3 is an illustration of a brake pad 300 that utilizes the same backing plate 101, friction lining 105, and formulation of surface coating 109 as brake pad 100, but the application of surface coating 109 forms a geometric pattern comprising a repeated pattern of parallelograms.

Figure 8:
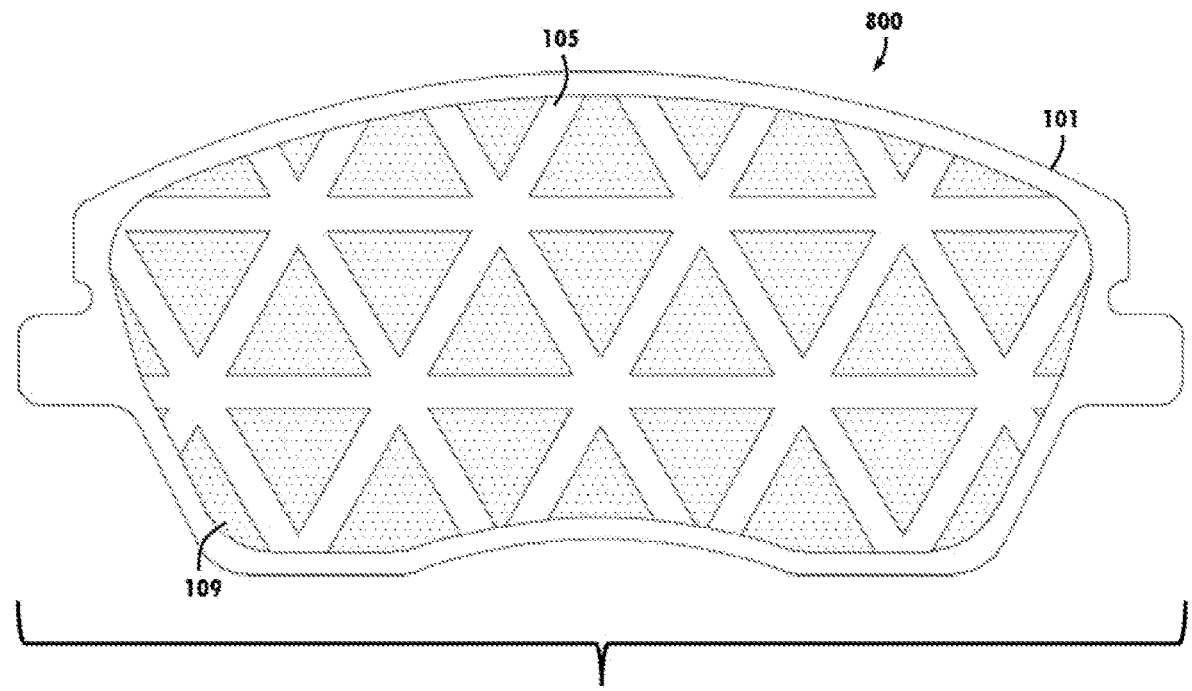
FIG. 8 is an illustration of a brake pad having a surface coating applied in a predetermined design.
Figure 9:
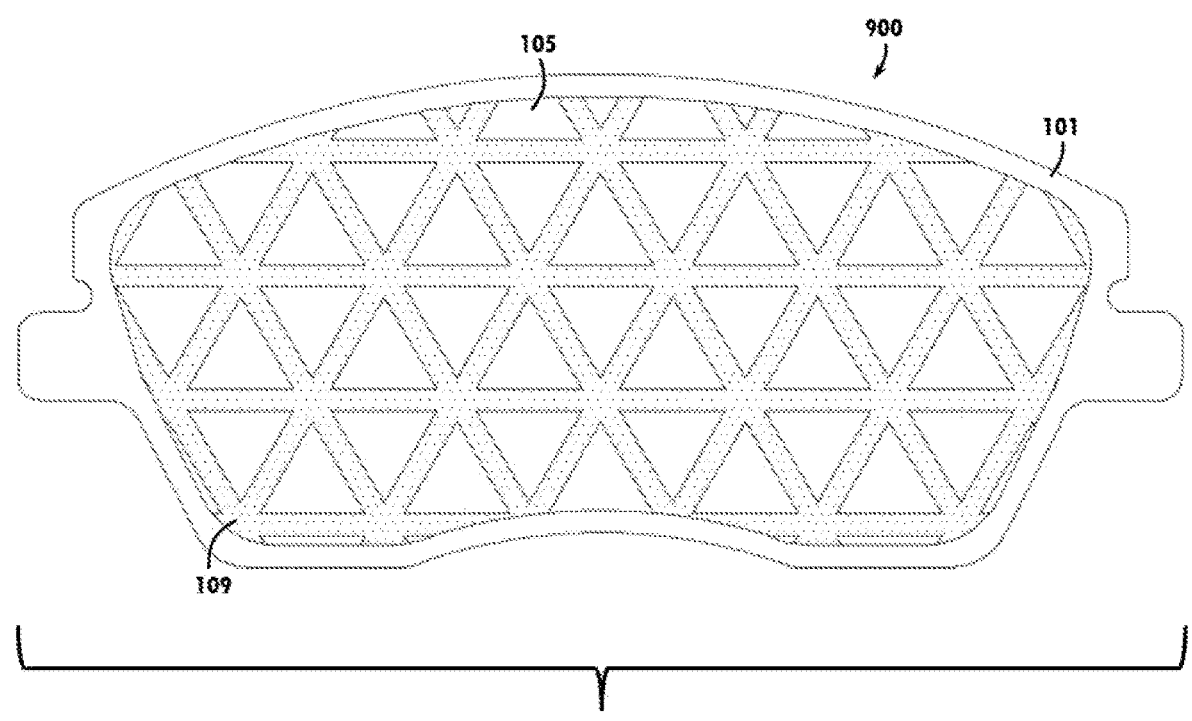
FIG. 9 is an illustration of a brake pad having a surface coating applied in a predetermined design.

FIG. 8 is an illustration of a brake pad 800 that utilizes the same backing plate 101, friction lining 105, and formulation of surface coating 109 as brake pad 100, but the application of surface coating 109 forms a geometric pattern comprising a repeated pattern of triangles. FIG. 9 is an illustration of a brake pad 900 that utilizes the same backing plate 101, friction lining 105, and formulation of surface coating 109 as brake pad 100, but the application of surface coating 109 forms a geometric pattern comprising a grid of triangles. Though in the depicted embodiments of FIG. 8 and FIG. 9 the geometric patterns are directed to equilateral triangles, other embodiments may comprise other triangle shapes without deviating from the teachings disclosed herein.

Figure 10:
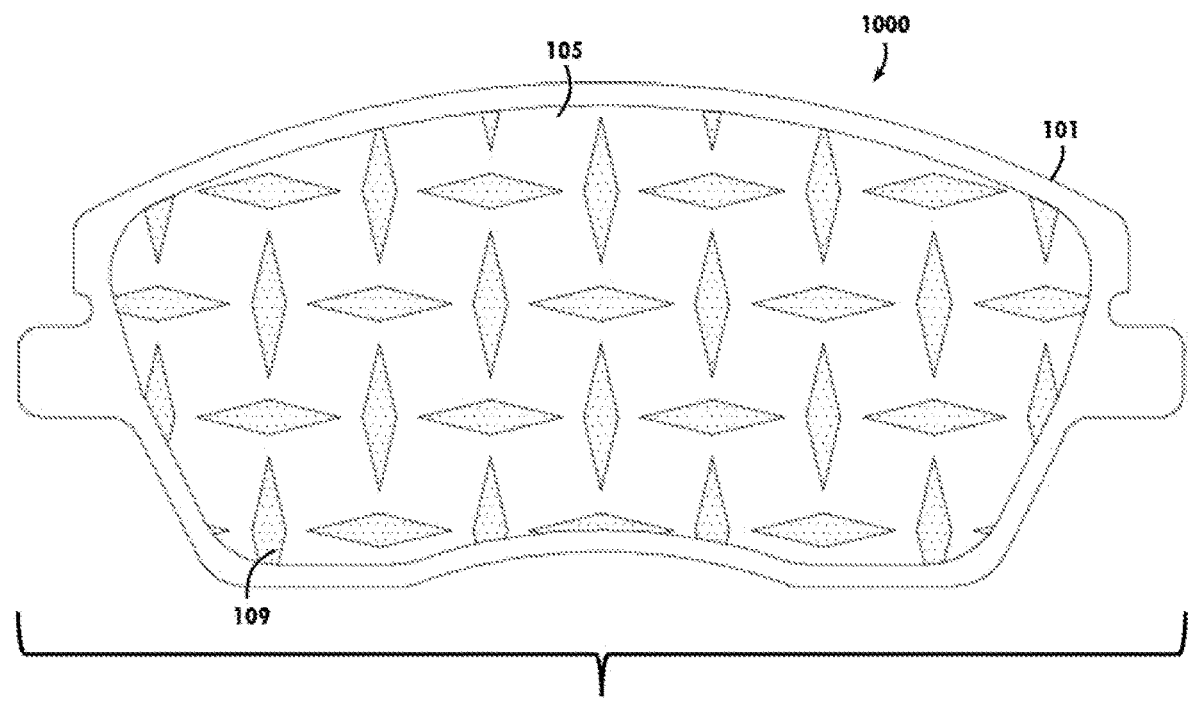
FIG. 10 is an illustration of a brake pad having a surface coating applied in a predetermined design.
Figure 11:
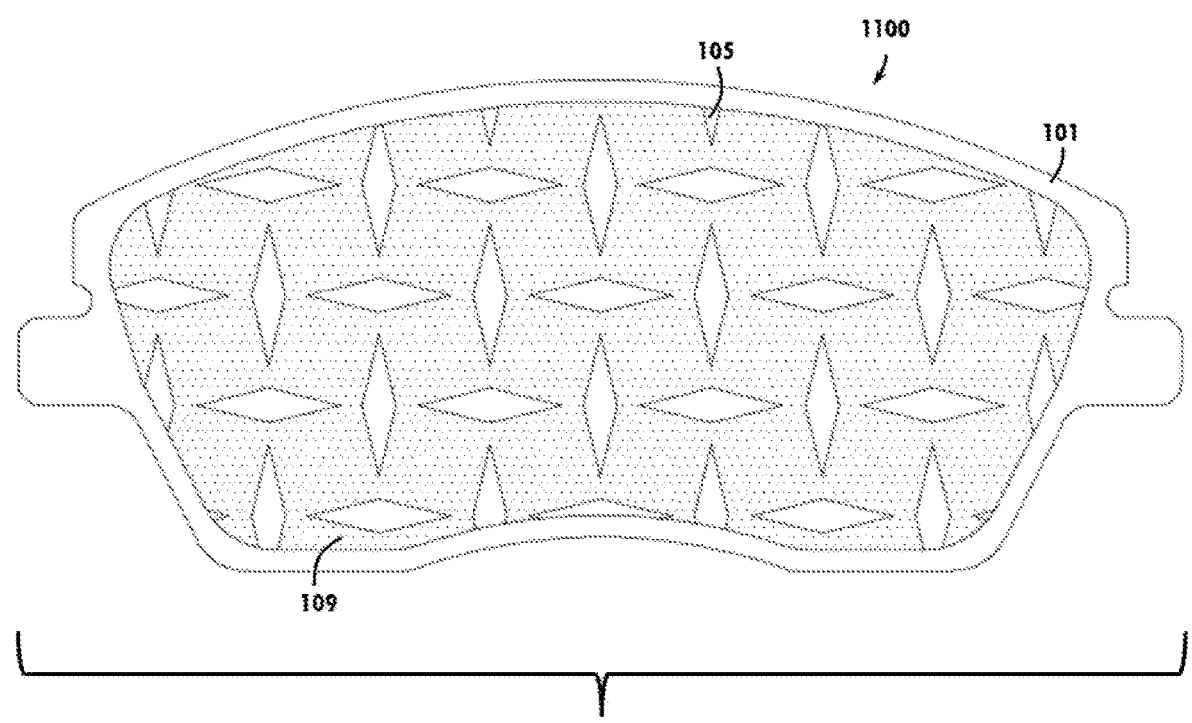
FIG. 11 is an illustration of a brake pad having a surface coating applied in a predetermined design.

FIG. 10 is an illustration of a brake pad 1000 that utilizes the same backing plate 101, friction lining 105, and formulation of surface coating 109 as brake pad 100, but the application of surface coating 109 forms a geometric pattern comprising a repeated pattern of diamonds configured in a "diamond plate" design. FIG. 11 is an illustration of a brake pad 1100 that utilizes the same backing plate 101, friction lining 105, and formulation of surface coating 109 as brake pad 100, but the application of surface coating 109 forms a geometric pattern comprising a grid of diamonds configured in a "diamond plate" design.

Figure 12:
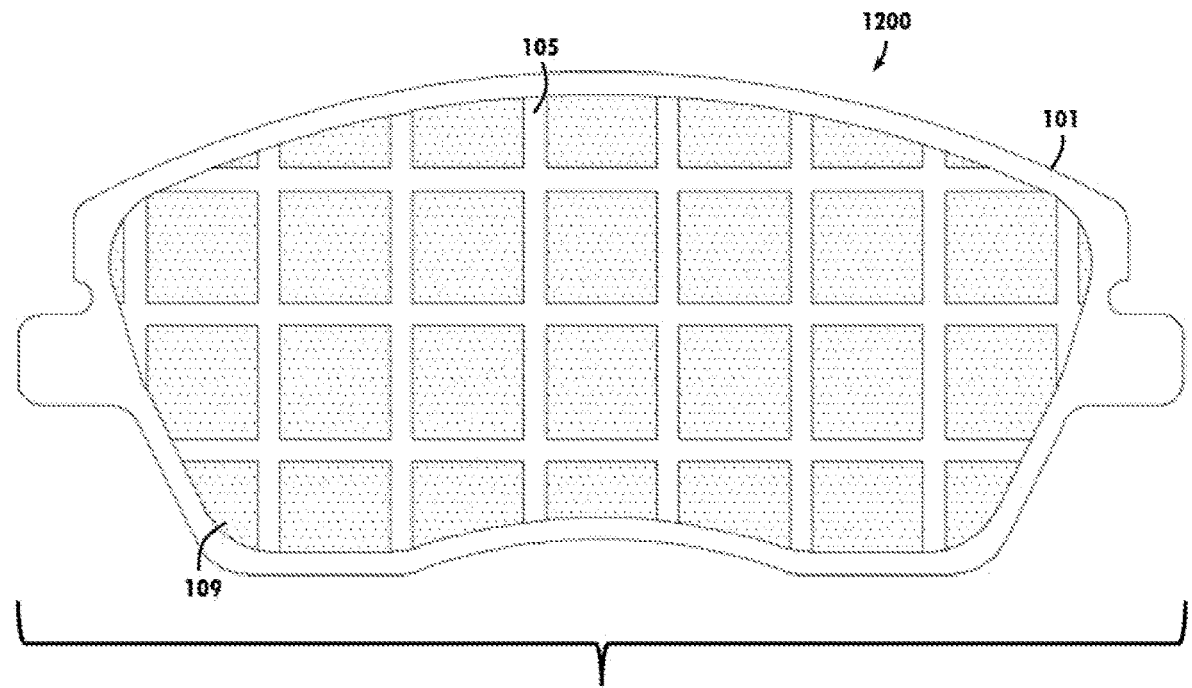
FIG. 12 is an illustration of a brake pad having a surface coating applied in a predetermined design.
Figure 13:
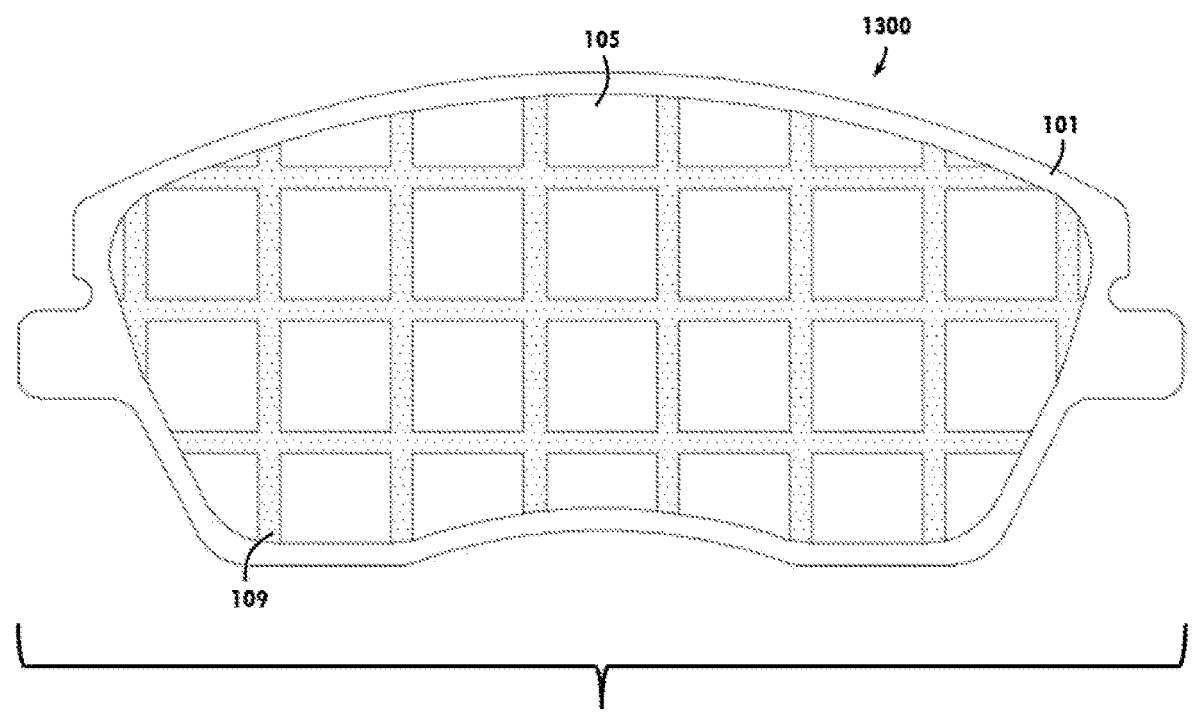
FIG. 13 is an illustration of a brake pad having a surface coating applied in a predetermined design.

FIG. 12 is an illustration of a brake pad 1200 that utilizes the same backing plate 101, friction lining 105, and formulation of surface coating 109 as brake pad 100, but the application of surface coating 109 forms a geometric pattern comprising a repeated pattern of squares. FIG. 13 is an illustration of a brake pad 1300 that utilizes the same backing plate 101, friction lining 105, and formulation of surface coating 109 as brake pad 100, but the application of surface coating 109 forms a geometric pattern comprising a grid of squares. Though in the depicted embodiments of FIG. 12 and FIG. 13 the geometric patterns are directed to squares, other embodiments may comprise other rectangle shapes without deviating from the teachings disclosed herein.

Some embodiments may comprise geometric patterns utilizing a plurality of geometric shapes.

Figure 14:
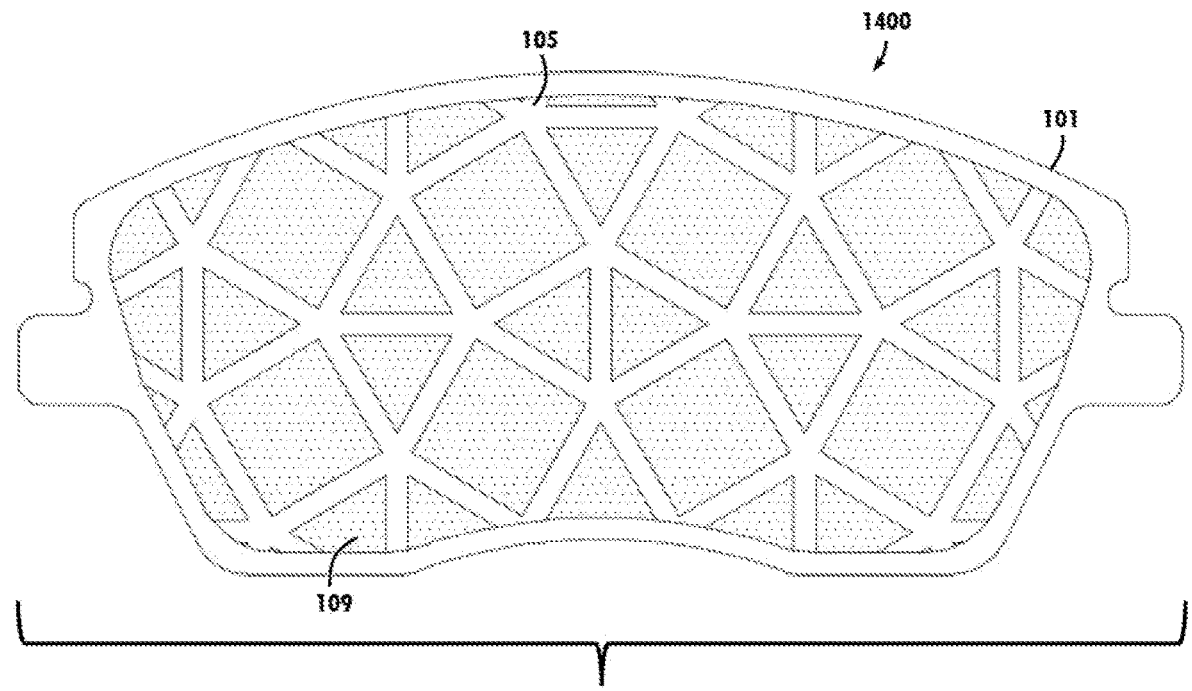
FIG. 14 is an illustration of a brake pad having a surface coating applied in a predetermined design.
Figure 15:
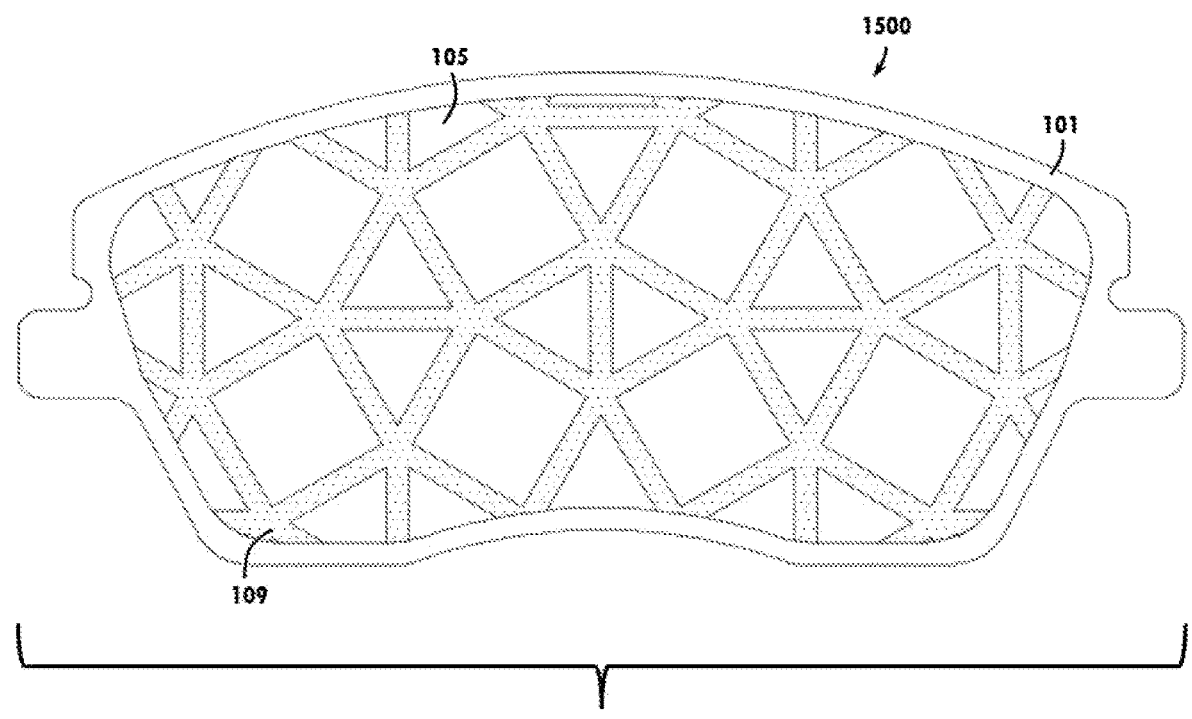
FIG. 15 is an illustration of a brake pad having a surface coating applied in a predetermined design.

FIG. 14 is an illustration of a brake pad 1400 that utilizes the same backing plate 101, friction lining 105, and formulation of surface coating 109 as brake pad 100, but the application of surface coating 109 forms a geometric pattern comprising a repeated pattern of squares and triangles. FIG. 15 is an illustration of a brake pad 1500 that utilizes the same backing plate 101, friction lining 105, and formulation of surface coating 109 as brake pad 100, but the application of surface coating 109 forms a geometric pattern comprising a grid of squares and triangles. Though in the depicted embodiments of FIG. 14 and FIG. 15 the geometric patterns are directed to squares and equilateral triangles, other embodiments may comprise other rectangle, triangle, or other shapes without deviating from the teachings disclosed herein. Though in the depicted embodiments of FIG. 14 and FIG. 15 the squares are depicted as having a greater area than the triangles, other embodiments may comprise differently-proportioned sizes of shapes without deviating from the teachings disclosed herein.

Figure 16:
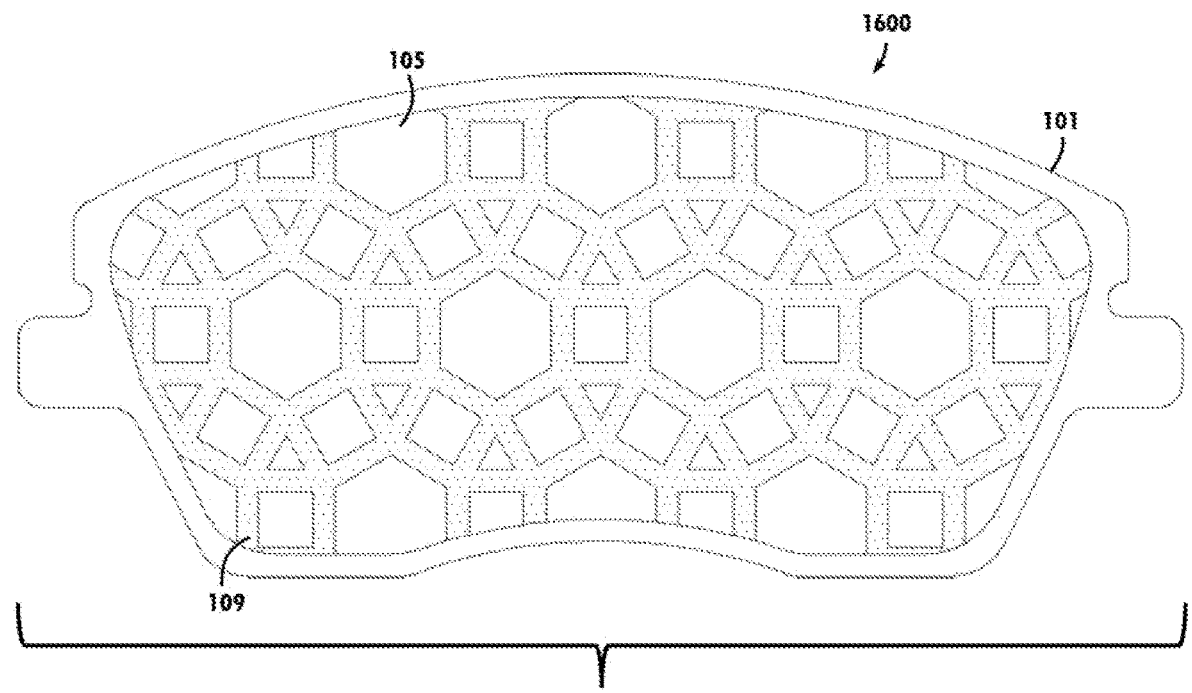
FIG. 16 is an illustration of a brake pad having a surface coating applied in a predetermined design.
Figure 17:
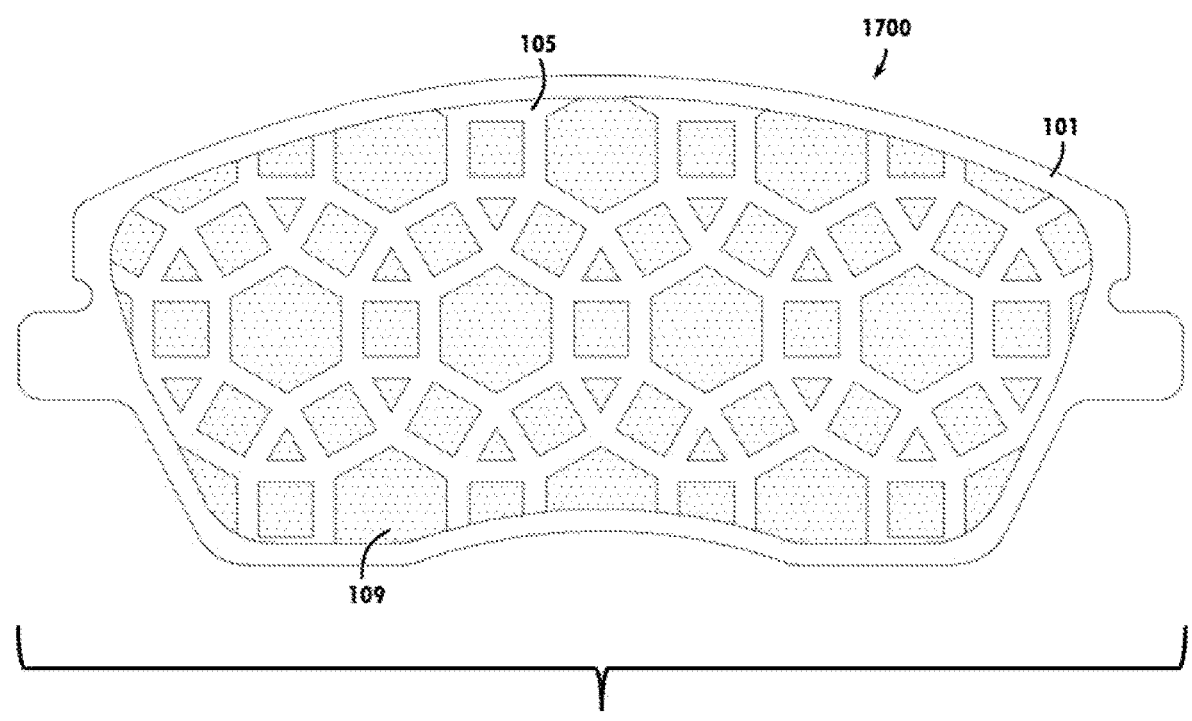
FIG. 17 is an illustration of a brake pad having a surface coating applied in a predetermined design.

FIG. 16 is an illustration of a brake pad 1600 that utilizes the same backing plate 101, friction lining 105, and formulation of surface coating 109 as brake pad 100, but the application of surface coating 109 forms a geometric pattern comprising a grid outlining a pattern of squares, hexagons, and triangles. FIG. 17 is an illustration of a brake pad 1700 that utilizes the same backing plate 101, friction lining 105, and formulation of surface coating 109 as brake pad 100, but the application of surface coating 109 forms a geometric pattern comprising a repeated pattern of squares, hexagons, and triangles. Though in the depicted embodiments of FIG. 16 and FIG. 17 the geometric patterns are directed to squares, regular hexagons, and equilateral triangles, other embodiments may comprise other rectangle, polygon, triangle, or other shapes without deviating from the teachings disclosed herein. Though in the depicted embodiments of FIG. 16 and FIG. 17 the hexagons are depicted having a greater area than the squares and the square are depicted having a greater area than the triangles, other embodiments may comprise differently-proportioned sizes of shapes without deviating from the teachings disclosed herein.

Some embodiments may comprise designs having a geometric pattern other than a repeated application of shapes.

Figure 18:
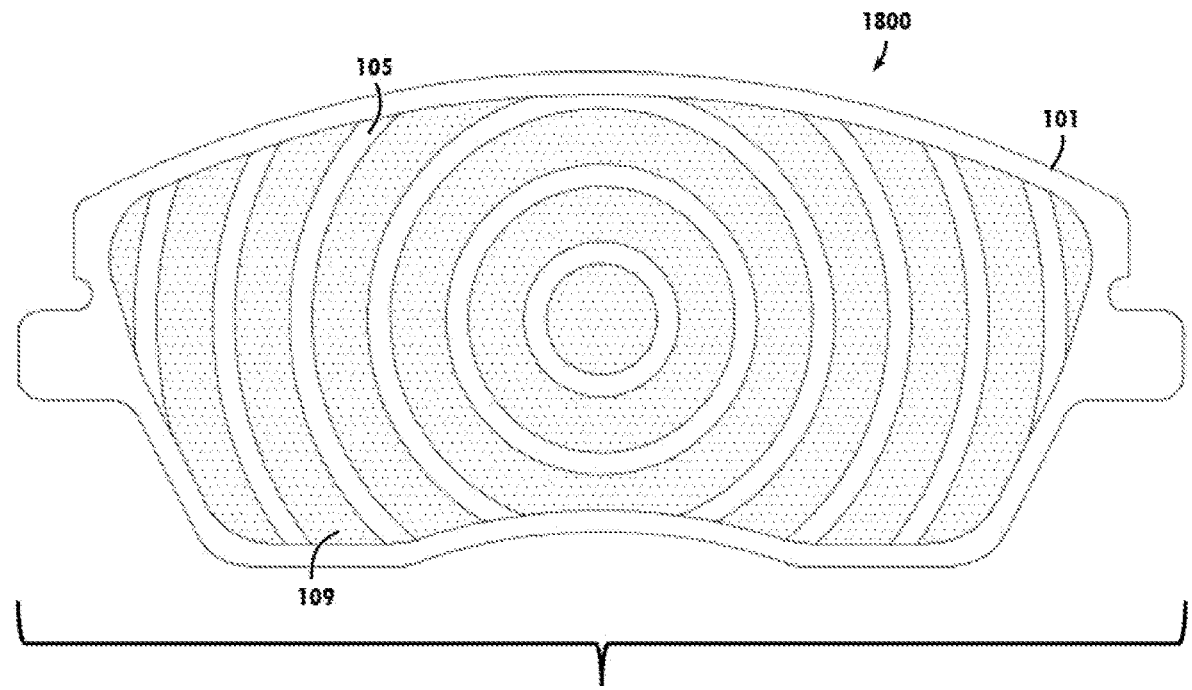
FIG. 18 is an illustration of a brake pad having a surface coating applied in a predetermined design.

FIG. 18 is an illustration of a brake pad 1800 that utilizes the same backing plate 101, friction lining 105, and formulation of surface coating 109 as brake pad 100, but the application of surface coating 109 forms a geometric pattern comprising a series of concentrically-arranged circular sections. Some embodiments may comprise an "inverse" application of surface coating 109 as depicted in FIG. 18, wherein the surface coating 109 forms circular sections having smaller area than the area of friction lining 105 without a coating. Such embodiments would not deviate from the teachings disclosed herein.

Figure 19:
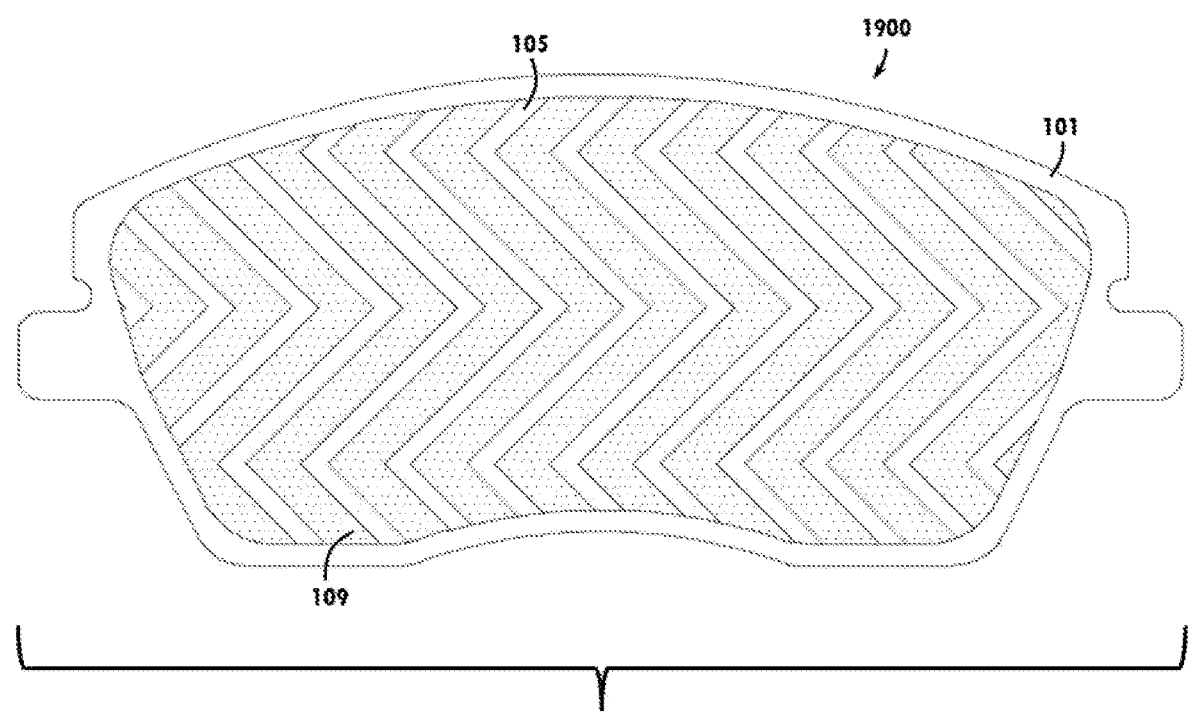
FIG. 19 is an illustration of a brake pad having a surface coating applied in a predetermined design.

FIG. 19 is an illustration of a brake pad 1900 that utilizes the same backing plate 101, friction lining 105, and formulation of surface coating 109 as brake pad 100, but the application of surface coating 109 forms a geometric pattern comprising a series of repeating "zigzag" shapes. Some embodiments may comprise an "inverse" application of surface coating 109 as depicted in FIG. 18, wherein the surface coating 109 forms zigzags having smaller area than the area of friction lining 105 without a coating. Such embodiments would not deviate from the teachings disclosed herein.

Some embodiments may comprise an asymmetrical application of a surface coating without deviating from the teachings disclosed herein.

Figure 20:
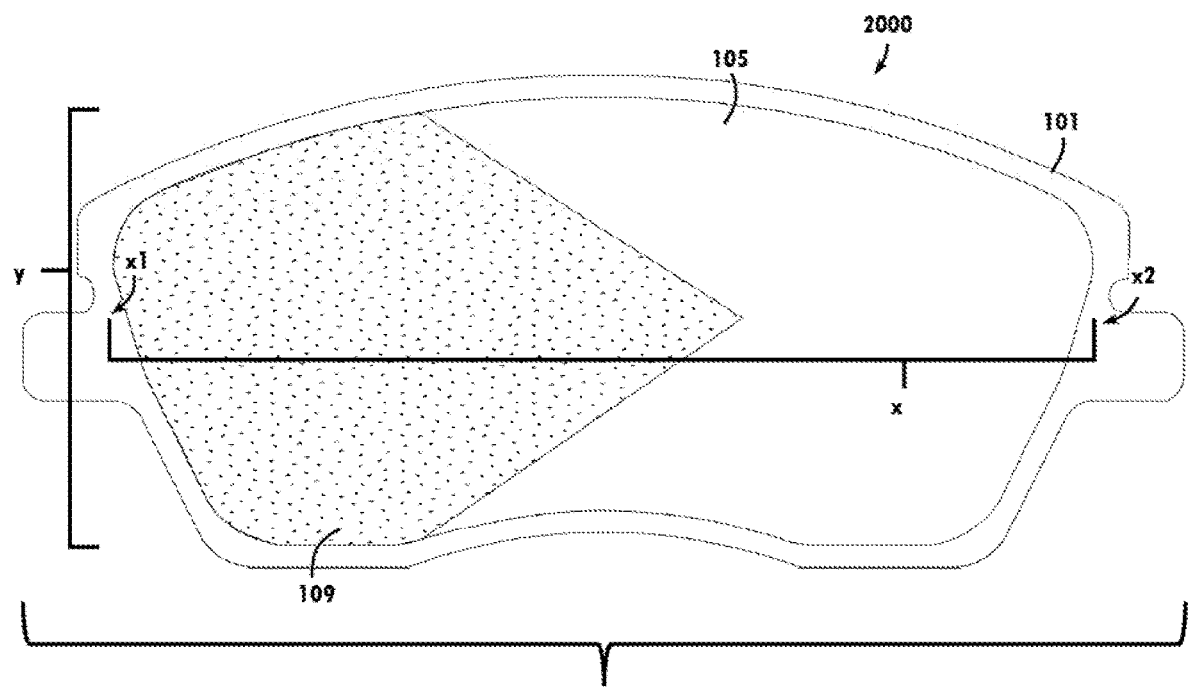
FIG. 20 is an illustration of a brake pad having a surface coating applied in a predetermined design.

FIG. 20 is an illustration of a brake pad 2000 that utilizes the same backing plate 101, friction lining 105, and formulation of surface coating 109 as brake pad 100, but the application of surface coating 109 is asymmetrically applied to the tribological surface of friction lining 105. In particular, the surface coating 109 varies with respect to a position along a length x of the friction lining 105. The variation of the application in the depicted embodiment changes along length x with respect to a width y of friction lining 105. At a proximal end x1 of length x, all of the associated width y is covered by surface coating 109. At a distal end x2 of length x, none of the friction lining 105 is covered by surface coating 109 at any point along width y. The coverage of surface coating 109 with respect to width y gradually diminishes between proximal end x1 and distal end x2. In the depicted embodiment, coverage of surface coating 109 tapers linearly, but other embodiments may comprise other arrangements without deviating from the teachings disclosed herein. In some embodiments, brake pad 2000 may be most-effectively utilized in a particular brake position within a vehicle. In such embodiments, brake pads may be utilized in tandem to provide effective braking on all wheels of the vehicle, with each brake pad having a specialized design suitable for its particular position when installed in the vehicle, without deviating from the teachings disclosed herein.

Figure 21:
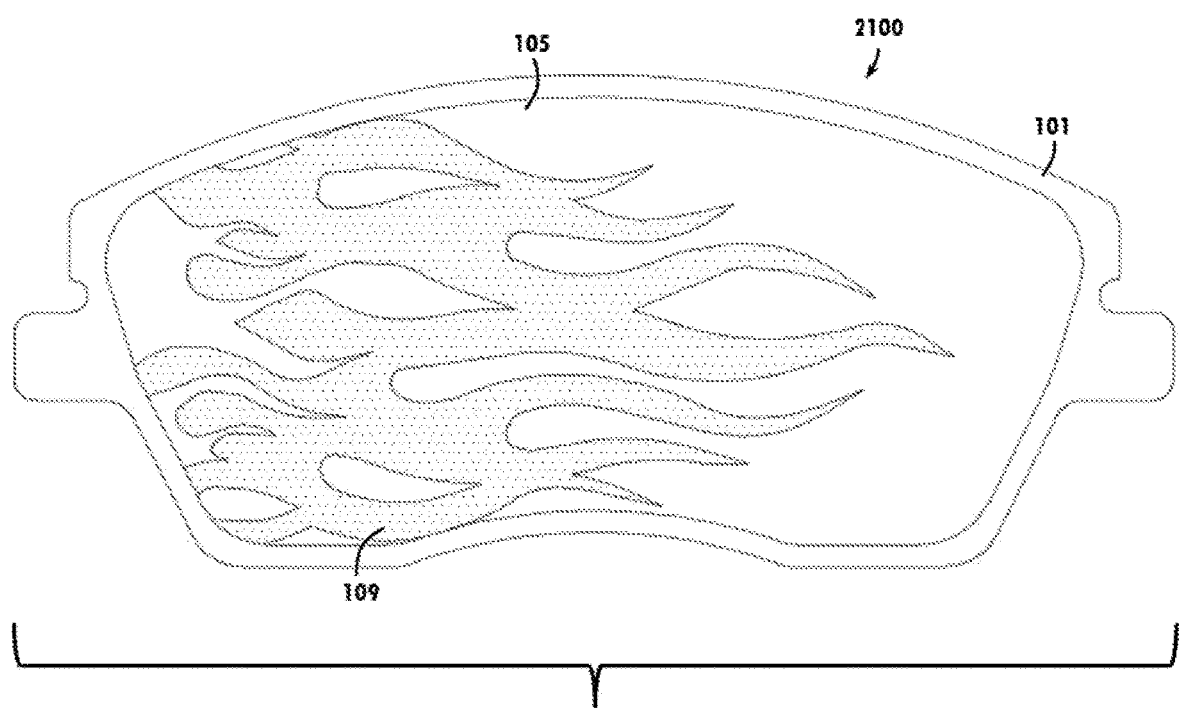
FIG. 21 is an illustration of a brake pad having a surface coating applied in a predetermined design.

Other asymmetrical designs may be utilized. FIG. 21 is an illustration of a brake pad 2100 that utilizes the same backing plate 101, friction lining 105, and formulation of surface coating 109 as brake pad 101, but the application of surface coating 109 is applied in a design resembling "hot rod flames." The design of surface coating 109 may be utilized to provide a visually-distinct look of a brake pad, and may be used to distinguish a particular brake pad to a potential buyer when displayed in a retail setting. Other designs may be used without deviating from the teachings disclosed herein. Other embodiments may utilize designs comprised of logos, licensed characters, graphic designs, text, photo-realistic images, or any combination thereof without deviating from the teachings disclosed herein.

While exemplary embodiments are described above, it is not intended that these embodiments describe all possible forms of the disclosed apparatus and method. Rather, the words used in the specification are words of description rather than limitation, and it is understood that various changes may be made without departing from the spirit and scope of the disclosure as claimed. The features of various implementing embodiments may be combined to form further embodiments of the disclosed concepts.

What is claimed is:

1. A brake pad, comprising:
   a back plate having a mounting surface;
   a friction lining having a tribological surface and coupled to the mounting surface such that the tribological surface is parallel to the mounting surface within a specified tolerance; and
   a surface coating affixed to the tribological surface, the surface coating being configured to establish tribological contact of the brake pad with a brake rotor, wherein the surface coating is affixed to the tribological surface using an adhesive, the surface coating having a predetermined design, and wherein the surface coating is configured to create a transfer layer of material onto the brake rotor during tribological contact of the brake pad and the brake rotor, wherein the predetermined design comprises an asymmetrical distribution of surface coating with respect to the surface area of the tribological surface, wherein the friction lining comprises a width dimension and a length dimension orthogonal to the width dimension and defining the friction lining between a proximal end and a distal end,
   wherein the predetermined design of the surface coating incorporates one or more of a graphic design, text, or a photo-realistic image,
   wherein the asymmetrical distribution of surface coating comprises a greater coverage of the width near the proximal end and a smaller coverage of the width near the distal end,
   wherein the predetermined design of the surface coating comprises a geometric pattern, the geometric pattern comprising a repeating pattern of concentrically-arranged circular sections or a repeating zig-zag pattern.

2. The brake pad of claim 1, wherein the predetermined design of the surface coating is created via a stamping operation using a plate featuring the predetermined design.

3. The brake pad of claim 1, wherein the geometric pattern comprises a repeating pattern of polygonal shapes.

4. The brake pad of claim 3, wherein the geometric pattern comprises a repeating pattern of hexagonal shapes.

5. The brake pad of claim 1, wherein the geometric pattern comprises a repeating pattern of elliptical shapes.

6. The brake pad of claim 1, wherein the geometric pattern comprises a repeating pattern having at least two different repeated shapes within the pattern.

7. The brake pad of claim 1, wherein the asymmetrical distribution of surface coating comprises a gradual transition of the surface coating coverage along the length from the proximal end to the distal end.

8. The brake pad of claim 1, wherein the adhesive has a specified curing time of no longer than 180 seconds.

9. A brake pad, comprising:
   a back plate having a mounting surface;
   a friction lining having a tribological surface and coupled to the mounting surface such that the tribological surface is parallel to the mounting surface within a specified tolerance; and
   a surface coating affixed to the tribological surface, the surface coating being configured to establish tribological contact of the brake pad with a brake rotor, wherein the surface coating is affixed to the tribological surface using an adhesive, the surface coating being visually distinct from the friction lining, and wherein the surface coating is configured to create a transfer layer of material onto the brake rotor during tribological contact of the brake pad and the brake rotor, wherein the surface coating comprises a predetermined design having an asymmetrical distribution of surface coating with respect to the surface area of the tribological surface, wherein the friction lining comprises a width dimension and a length dimension orthogonal to the width dimension and defining the friction lining between a proximal end and a distal end,
   wherein the predetermined design of the surface coating incorporates one or more of a graphic design, text, or a photo-realistic image,
   wherein the asymmetrical distribution of surface coating comprises a greater coverage of the width near the proximal end and a smaller coverage of the width near the distal end, and
   wherein the predetermined design of the surface coating comprises a geometric pattern, the geometric pattern comprising a repeating pattern of concentrically-arranged circular sections.

10. The brake pad of claim 9, wherein the asymmetrical distribution of surface coating comprises a gradual transition of the surface coating coverage along the length from the proximal end to the distal end.

11. The brake pad of claim 9, wherein the adhesive has a specified curing time of no longer than 180 seconds.

12. A brake pad, comprising:
    a back plate having a mounting surface;
    a fiction lining having a tribological surface and coupled to the mounting surface such that the tribological surface is parallel to the mounting surface within a specified tolerance; and
    a surface coating affixed to the tribological surface, the surface coating being configured to establish tribological contact of the brake pad with a brake rotor, wherein the surface coating is affixed to the tribological surface using an adhesive, the surface coating being visually distinct from the friction lining and having a predetermined design, and wherein the surface coating is configured to create a transfer layer of material onto the brake rotor during tribological contact of the brake pad and the brake rotor,
    wherein the predetermined design comprises an asymmetrical distribution of surface coating with respect to the surface area of the tribological surface, and wherein the friction lining comprises a width dimension and a length dimension orthogonal to the width dimension and defining the friction lining between a proximal end and a distal end,
    wherein the predetermined design of the surface coating incorporates one or more of a graphic design, text, or a photo-realistic image,
    wherein the asymmetrical distribution of surface coating comprises a greater coverage of the width near the proximal end and a smaller coverage of the width near the distal end, and
    wherein the predetermined design of the surface coating comprises a geometric pattern, the geometric pattern comprising a repeating zig-zag pattern.

13. The brake pad of claim 12, wherein the predetermined design of the surface coating is created via a stamping operation using a plate featuring the predetermined design.

14. The brake pad of claim 12, wherein the geometric pattern comprises a repeating pattern of polygonal shapes.

15. The brake pad of claim 14, wherein the geometric pattern comprises a repeating pattern comprising at least two different repeated shapes within the pattern.

16. The brake pad of claim 12, wherein the asymmetrical distribution of surface coating comprises a gradual transition of the surface coating coverage along the length from the proximal end to the distal end.

* * * * *